United States Patent
Andersson et al.

(10) Patent No.: US 8,170,599 B2
(45) Date of Patent: May 1, 2012

(54) FORMAT BASED POWER CONTROL

(75) Inventors: Lennart Andersson, Båstad (SE); Tobias Junno, Lund (SE); Torgny Palenius, Barsebäck (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 492 days.

(21) Appl. No.: 12/420,904

(22) Filed: Apr. 9, 2009

(65) Prior Publication Data

US 2010/0130243 A1 May 27, 2010

Related U.S. Application Data

(60) Provisional application No. 61/116,864, filed on Nov. 21, 2008.

(51) Int. Cl.
*H04B 7/00* (2006.01)
(52) U.S. Cl. ..... 455/522; 455/69; 455/67.11; 455/127.1; 455/228; 370/320; 370/337; 370/342; 370/348
(58) Field of Classification Search .................. 455/522, 455/69, 127.1, 67.11, 228; 370/320, 337, 370/342, 348
See application file for complete search history.

(56) References Cited

U.S. PATENT DOCUMENTS

| | | | |
|---|---|---|---|
| 6,493,541 B1 | 12/2002 | Gunnarsson et al. | |
| 6,738,605 B1 * | 5/2004 | Gilberton et al. | 455/127.1 |
| 7,292,552 B2 * | 11/2007 | Willenegger et al. | 370/333 |
| 7,376,438 B2 | 5/2008 | Shiu et al. | |
| 7,606,294 B2 * | 10/2009 | Kokubo | 375/148 |
| 7,664,519 B2 * | 2/2010 | Hsu et al. | 455/522 |
| 7,817,972 B2 * | 10/2010 | Wan et al. | 455/115.1 |
| 2003/0036403 A1 * | 2/2003 | Shiu et al. | 455/522 |
| 2004/0137860 A1 | 7/2004 | Oh et al. | |
| 2004/0203987 A1 * | 10/2004 | Butala | 455/522 |
| 2005/0099968 A1 | 5/2005 | Yamano | |
| 2006/0256732 A1 * | 11/2006 | Hamalainen | 370/252 |
| 2006/0293075 A1 | 12/2006 | Kansakoski et al. | |
| 2008/0171523 A1 * | 7/2008 | Anderson et al. | 455/127.1 |
| 2009/0061886 A1 | 3/2009 | Cozzo et al. | |
| 2010/0039972 A1 * | 2/2010 | Wang et al. | 370/311 |
| 2011/0009152 A1 * | 1/2011 | Butala | 455/522 |

FOREIGN PATENT DOCUMENTS

EP 1069704 A1 1/2001

(Continued)

OTHER PUBLICATIONS

Lucent Technologies, "Downlink Model for HSDPA," R1-01-0312, TSG-RAN Working Group 1 #19, Feb. 26-Mar. 2, 2007, pp. 1-4, Las Vegas, Nevada, US.

(Continued)

*Primary Examiner* — Linh Nguyen
(74) *Attorney, Agent, or Firm* — Coats & Bennett, P.L.L.C.

(57) ABSTRACT

Power control methods and apparatus taught herein advantageously provide quick convergence to the signal quality target needed to achieve a given data error rate target, when changes in transport format use by a given transport channel require such convergence. Specifically, the methods and apparatus maintain a "baseline" signal quality target that stays current with changing signal propagation conditions because it is common to all transport formats used by the transport channel. The methods and apparatus then bias this baseline signal quality target with a target offset particularized for the transport format in use. This offset may be selected from memory or dynamically calculated, and, regardless, can often be applied after a single transmission time interval.

20 Claims, 5 Drawing Sheets

FOREIGN PATENT DOCUMENTS

| EP | 1124340 A1 | 8/2001 |
|---|---|---|
| EP | 1876733 A1 | 1/2008 |
| EP | 1942586 A2 | 7/2008 |
| WO | 02/43275 A2 | 5/2002 |
| WO | 2008/076065 A2 | 6/2008 |

OTHER PUBLICATIONS

Lou, G. et al. "A Novel Dynamic Stepsize Power Control Algorithm for UMTS W-CDMA Systems." 2006 6th International Conference on ITS Telecommunications Proceedings, Jun. 2006, pp. 490-495.

3rd Generation Partnership Project. "Improved Performance Requirements for Downlink Outer Loop Power-Control (DF OLPC)." TSG-RAN4 Meeting #49, R4=083016, Nov. 2008.

3rd Generation Partnership Project. "LS on Outer loop TRC behaviour in 0 bit TB reception for A-DPCH." 3GPP TSG-RAN4 Meeting #34, T-doc R4-050267, Pnoenix, AZ, US, Feb. 14-18, 2005.

* cited by examiner

FORMAT BASED POWER CONTROL

CROSS REFERENCE TO RELATED APPLICATIONS

This application claims priority under 35 U.S.C. §119(e) from Provisional Patent Application No. 61/116,864, filed Nov. 21, 2008, the entire contents of which are incorporated herein by reference.

TECHNICAL FIELD

The present invention generally relates to transmit power control in wireless communication systems, and particularly relates to apparatus and methods for controlling the power of transmissions using multiple transport formats.

BACKGROUND

Transmit power control plays an important role in interference-limited wireless communication systems, such as those based on Code Division Multiple Access (CDMA) technologies. In these systems, transmit power control allows a transmitter to transmit at sufficient power to achieve acceptable data error rates at the receiver over changing reception conditions, but prevents the transmitter from transmitting at excessive power to limit multi-user interference.

In particular, a receiver maintains an "inner-loop" and an "outer-loop" power control mechanism to provide power control feedback to a remote transmitter. The inner-loop generates this power control feedback in the form of Transmit Power Commands (TPCs). The TPCs instruct the transmitter to increase or decrease its transmit power depending on whether the estimated signal quality at the receiver is below or above a signal quality target (e.g., a target signal-to-interference ratio, SIR). Under changing signal propagation conditions, however, the outer-loop adjusts this signal quality target over time to achieve a given data error rate target (e.g., a block error rate, BLER).

Some contexts complicate the above approach to transmit power control. For example, commonly a transmitter transfers data to a receiver over one or more transport channels that are logically carried by a physical channel. Each transport channel permits transmission of different types or rates of data, depending on the use of one or more transport formats during a given transmission time interval, and specifies its own data error rate target. In this context, transmit power control varies the power on the physical channel to achieve all of the data error rate targets specified on the transport channels.

More particularly, with each transport channel specifying a data error rate target, the outer-loop maintains a signal quality target for each transport channel. The inner-loop then compares the estimated signal quality on the physical channel to a maximum of the signal quality targets. By generating TPCs based on this maximum signal quality target, the inner-loop ensures the power on the physical channel is sufficient to achieve even the most stringent of data error rate targets specified on the transport channels.

Yet the signal quality target maintained for a transport channel, needed to fulfill the data error rate target specified on that transport channel, depends on the used transport format. That is, because different transport formats specify different code block sizes, coding schemes, etc., different signal quality targets are required to achieve the same data error rate target. Thus, not only must the outer-loop continually adjust the signal quality target of a transport channel to account for changing signal propagation conditions, but the outer-loop must also adjust this target each time a transport channel switches to using a different transport format. Whether required because of changes in signal propagation conditions, transport format use, or both, rapid adjustment of a signal quality target is highly desired so that its value quickly converges to that needed to achieve the corresponding data error rate target.

Various prior control loop designs addressing this issue adjust a signal quality target according to a 'jump' algorithm. Per the jump algorithm, the outer-loop significantly increases a signal quality target when erroneous data is received. This significant increase facilitates a faster convergence time. On average, however, more correct data should be received than erroneous data. To achieve an unbiased average data error rate target, therefore, the outer-loop only slightly decreases the signal quality target when correct data is received. Yet because the outer-loop must adjust the signal quality target over multiple transmission time intervals, convergence of that target is still relatively slow.

Other prior control loop designs also experience relatively slow convergence. The control loop design described in U.S. Pat. No. 7,376,438 to Shiu et al., for example, maintains a signal quality target for each transport format. When a transport channel uses a given transport format, Shiu adjusts its corresponding signal quality target to account for changes in signal propagation conditions and generates TPCs based on this signal quality target. When the transport channel changes to using a different transport format, however, its corresponding signal quality target does not reflect current signal propagation conditions and must be adjusted accordingly. Thus, such a control loop design still experiences slow convergence over multiple transmission time intervals.

SUMMARY

Power control methods and apparatus taught herein advantageously provide quick convergence to the signal quality target needed to achieve a given data error rate target, when changes in transport format use by a given transport channel require such convergence. Specifically, the methods and apparatus maintain a "baseline" signal quality target that stays current with changing signal propagation conditions because it is common to all transport formats used by the transport channel. The methods and apparatus then bias this baseline signal quality target with a target offset particularized for the transport format in use. This offset may be selected from memory or dynamically calculated, and, regardless, can often be applied after a single transmission time interval. Thus, relative to prior approaches that gradually adjust the signal quality target over multiple intervals or require further adjustment to reflect current signal propagation conditions, the methods and apparatus disclosed provide quick power control convergence.

More particularly, a wireless communication apparatus includes an outer-loop power control circuit and an inner-loop power control circuit. The inner-loop power control circuit generates commands for a remote transmitter that instruct it to increase or decrease its transmit power on a physical channel. These commands are generated based on comparing the signal quality on the physical channel with one or more "biased" signal quality targets provided to the inner-loop by the outer-loop. These biased signal quality targets are the signal qualities needed to maintain data error rate targets specified on each transport channel carried by the physical channel. Furthermore, these "biased" signal quality targets quickly account for changes in transport format use by the transport channels.

On this point, the outer-loop power control circuit includes one or more baseline control circuits, one for each transport channel, and a target biasing circuit. Each baseline control circuit maintains a "baseline" signal quality target that is common to all transport formats used by a corresponding transport channel. Accordingly, the baseline control circuit adjusts a baseline signal quality target over each transmission time interval in order to account for and stay current with changes in signal propagation conditions.

To also account for changes in transport format use, the target biasing circuit corresponding to a certain transport channel identifies the transport format of the current data transmission. With the transport format in use identified, the target biasing circuit applies a target offset particularized for that transport format to the corresponding baseline signal quality target. In fact, the target offset can often be applied after a single transmission time interval.

In one or more embodiments, the outer-loop power control circuit determines the transport format-specific target offsets by selecting one or more values from memory. These values may have been determined previously as the amount of bias above or below the baseline signal quality target that is needed to achieve the data error rate when a given transport format is in use. Alternatively, the values may be default values, which are subsequently updated or adapted to dynamically reflect that amount of bias, or calculated values, which are computed based on a quality requirement for the transport format. Thus, relative to prior approaches that gradually adjust the signal quality target over multiple intervals or require further adjustment to reflect current signal propagation conditions, the methods and apparatus disclosed provide quick power control convergence.

Of course, the present invention is not limited to the above features and advantages. Indeed, those skilled in the art will recognize additional features and advantages upon reading the following detailed description, and upon viewing the accompanying drawings.

DETAILED DESCRIPTION

Figure 1:
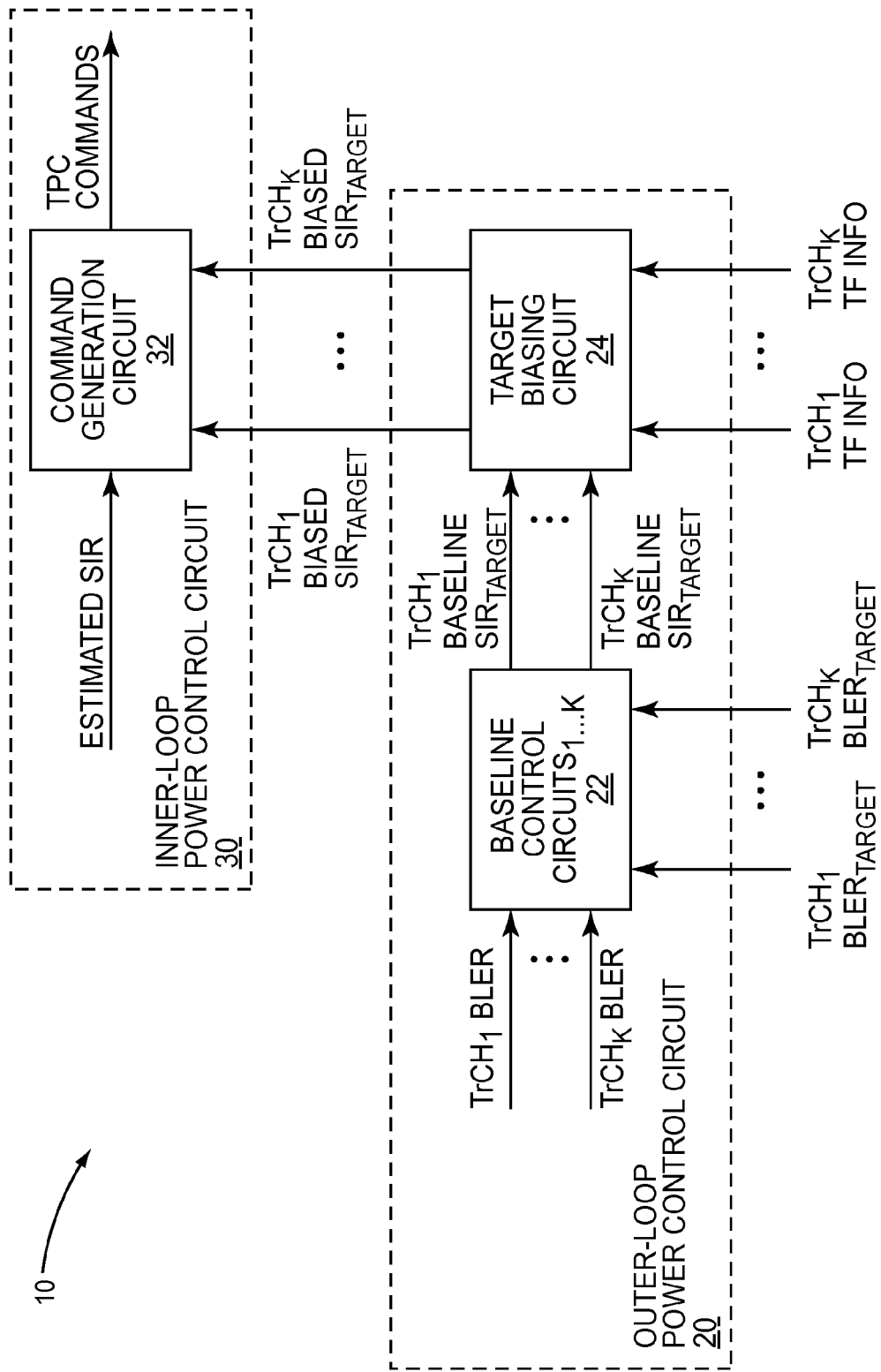
FIG. 1 is a block diagram illustrating one embodiment of a wireless communication apparatus having inner and outer-loop power control circuits.

FIG. 1 illustrates one embodiment of a wireless communication apparatus 10 configured to control the transmit power of a remote transmitter (not shown) on a physical channel. The wireless communication apparatus 10 includes an outer-loop power control circuit 20 and an inner-loop power control circuit 30.

The inner-loop power control circuit 30 includes a command generation circuit 32 that generates transmit power control (TPC) commands for the remote transmitter. Such TPC commands may, for example, instruct the remote transmitter to increase or decrease its transmit power on the physical channel.

Specifically, the physical channel carries K transport channels (TrCHs) for transmission of different types or rates of data, depending on the use of one or more transport formats (TFs). Accordingly, a data error rate target, expressed in this embodiment as a block error rate (BLER), is specified on each of the $TrCHs_{1...K}$. The outer-loop power control circuit 20 provides to the command generation circuit 32 signal quality targets (e.g., signal-to-interference ratios, SIRs) that are needed to maintain the BLER targets specified on the $TrCHs_{1...K}$. With these SIR targets, the command generation circuit 32 generates TPC commands to keep the transmit power on the physical channel at the lowest level that still permits achievement of the BLER targets. Moreover, even when changes in TF use cause a signal quality target to deviate from that needed to achieve a corresponding BLER target, the power control circuits 20, 30 provide relatively quick convergence back to that signal quality target (e.g., after one transmission time interval).

To do so, the outer-loop power control circuit 20 includes K baseline control circuits 22, one for each of the $TrCHs_{1...K}$. Each baseline control circuit$_k$ maintains a "baseline" SIR target for a corresponding $TrCH_k$. This $TrCH_k$ baseline $SIR_{Target}$ is common to all TFs used by that $TrCH_k$ and, therefore, is adjusted by the baseline control circuit$_k$ over each transmission time interval based on the ongoing receipt of data on the $TrCH_k$. Thus, such a baseline $SIR_{Target}$ accounts for and operates to stay current with changes in signal propagation conditions.

In at least one embodiment and as shown in FIG. 1, each baseline control circuit$_k$ maintains the baseline $SIR_{Target}$ in this way by comparing the $BLER_{Target}$ specified on the corresponding $TrCH_k$ with an estimate of the actual BLER on that $TrCH_k$. The BLER on the $TrCH_k$ is estimated as the ratio of erroneous transport blocks received in a certain amount of time on the $TrCH_k$, regardless of the TF used, to the total number of transport blocks received in that time on the $TrCH_k$. The determination of erroneous transport blocks may be made, for example, by a cyclic redundancy check (CRC) or filtering of those blocks. In fact, one embodiment of the present invention estimates the BLER based directly on a CRC flag (or similar error measure), whereby the BLER will be "1" if an erroneous block is received and "0" if a correct block is received (presuming, of course, that only one block is transmitted in the same transmission time interval). Regardless, the BLER is estimated without distinguishing between the TF in use.

Given such a BLER estimate that does not distinguish between changes in TFs, the baseline control circuit$_k$ increases the $TrCH_k$ baseline $SIR_{Target}$ over each transmission time interval if the BLER estimate is above the $BLER_{Target}$ (e.g., to account for increased data error due to worsened signal propagation conditions). Conversely, the baseline control circuit$_k$ decreases the $TrCH_k$ baseline $SIR_{Target}$ over each transmission time interval if the BLER estimate is below the $BLER_{Target}$ (e.g., to account for decreased data error due to improved signal propagation conditions). The amount of such increase or decrease may conform, for example, to the conventional "jump" algorithm discussed above. In this case, the $TrCH_k$ baseline $SIR_{Target}$ may be gradually decreased over each transmission time interval, and, thus, convergence to the SIR needed to achieve the $BLER_{Target}$ may still be relatively slow in accounting for changes in signal propagation conditions.

However, as discussed below, the outer-loop power control circuit 20 allows for quick convergence to the SIR needed to achieve the $BLER_{Target}$ in accounting for changes in TF use. More particularly, the outer-loop power control circuit 20 further includes a target biasing circuit 24. The target biasing circuit 24 receives the baseline $SIR_{Target}$ maintained for each of the $TrCHs_{1...K}$, as well as TF information for those $TrCHs_{1...K}$. The TF information for a given $TrCH_k$ contains information on which TF is in use by that $TrCH_k$. With this information, the target biasing circuit 24 biases the $TrCH_k$ baseline $SIR_{Target}$ with a target offset particularized for the TF in use. That is, the target biasing circuit 24 offsets the baseline $SIR_{Target}$ by a certain amount that depends on the TF in use for each $TrCH_k$.

Of course, for the target biasing circuit 24 to apply a target offset particularized for the TF in use, the TF of the current data transmission must be identified. Such identification may be made, for example, through inspection of a transport format indicator (TFI) or blind detection as is known in the art. Although this identification may delay application of the target offset for the TF currently in use, that offset can still be applied during the current transmission time interval or at the beginning of the next interval. Thus, by applying a TF-specific target offset to the $TrCH_k$ baseline $SIR_{Target}$, the target biasing circuit 24 quickly accounts for changes in TF after a single transmission time interval.

This allows for particularly quick convergence to the SIR needed to achieve the $BLER_{Target}$ when only changes in TF use, and not signal propagation conditions, have occurred. Consider, for example, the case where the power control loops 20, 30 have converged to the requisite SIR for a $TrCH_k$ at a given transmission time interval. If signal propagation conditions remain the same for the next transmission time interval, but the TF used by that $TrCH_k$ changes, the $TrCH_k$ baseline $SIR_{Target}$ likewise remains the same and is biased with a new target offset particularized for the newly used TF. As discussed above, application of this new target offset occurs after a single transmission time interval, and, thus, the biased $SIR_{Target}$ obtained for the $TrCH_k$ is almost immediately adjusted to be the SIR necessary to achieve the $TrCH_k$ $BLER_{Target}$.

Generally, therefore, the biased $SIR_{Target}$ obtained for each of the $TrCHs_{1...K}$ may quickly indicate to the inner-loop power control circuit 30 the SIR necessary to achieve the $BLER_{Target}$ specified on each of the $TrCHs_{1...K}$ after a change in TF use. Provided with these biased SIR targets, the command generation circuit 32 generates the TPC commands instructing the remote transmitter to increase or decrease its transmit power based on comparing the biased targets to the estimated SIR of the physical channel.

Figure 2:
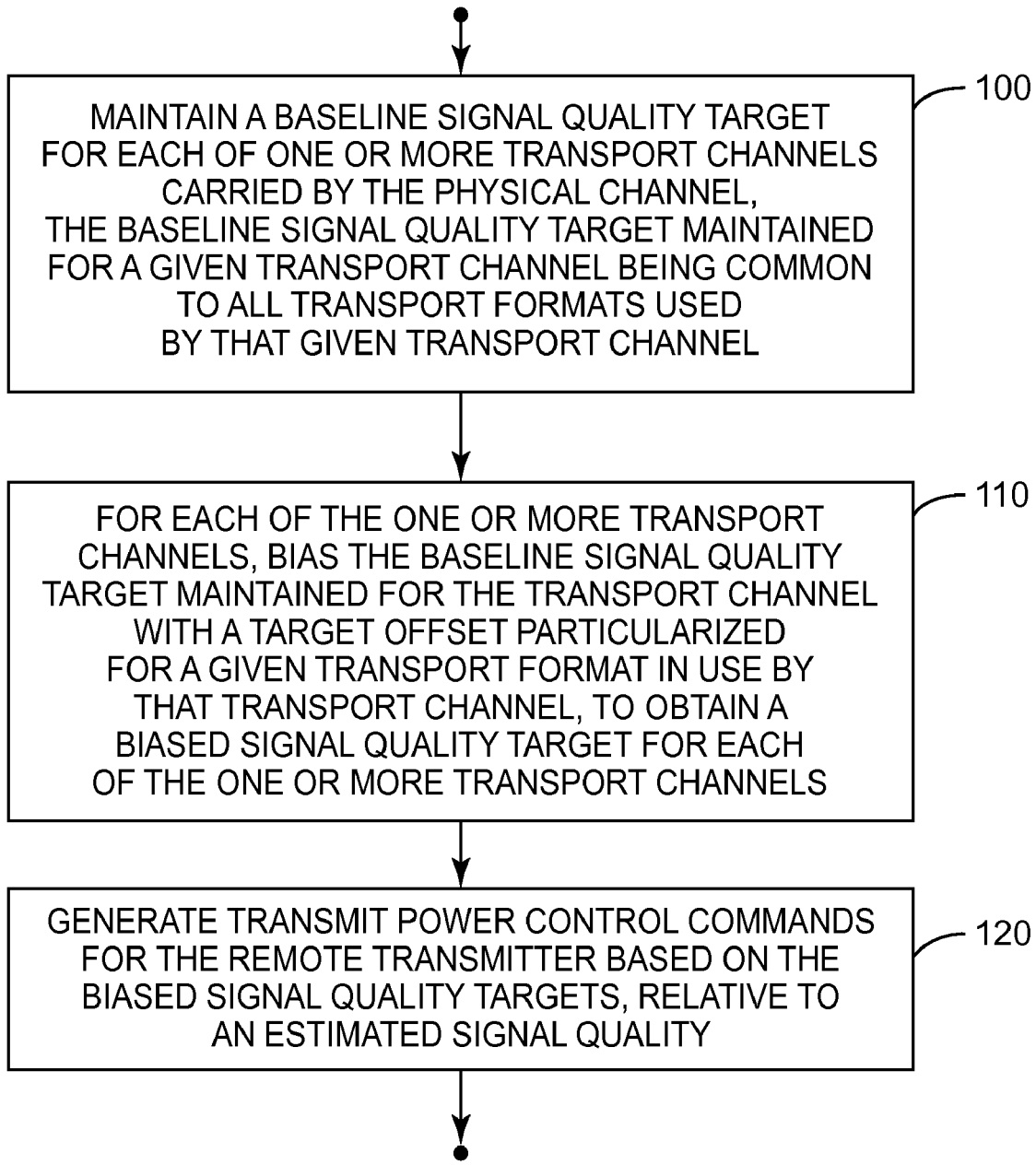
FIG. 2 is a logic flow diagram illustrating one embodiment of a method for controlling the transmit power of a signal received from a remote transmitter.

With the above points of variation and implementation of the wireless communication apparatus 10 in mind, those skilled in the art will appreciate that the wireless communication apparatus 10 of the present invention generally performs the method illustrated in FIG. 2. According to FIG. 2, the baseline control circuits$_{1...K}$ maintain a baseline signal quality target for each of the one or more $TrCHs_{1...K}$ carried by the physical channel (Block 100). As described above, each baseline signal quality target maintained for a given $TrCH_k$ (e.g., $TrCH_k$ baseline $SIR_{Target}$) is common to all TFs used by that $TrCH_k$. This allows the baseline signal quality target to be adjusted each transmission time interval and thereby stay current with changes in signal propagation conditions.

To quickly account for changes in TF use, the target biasing circuit 24 biases the baseline signal quality target maintained for each $TrCH_k$ with a target offset particularized for the TF in use by that $TrCH_k$ (Block 110). Such biased signal quality targets may be obtained, for example, after a single transmission time interval, depending on concurrent changes in signal propagation conditions. Given the biased signal quality targets, the command generation circuit 32 generates TPC commands for the remote transmitter based on these targets, relative to the estimated signal quality of the physical channel. (Block 120).

Figure 3:
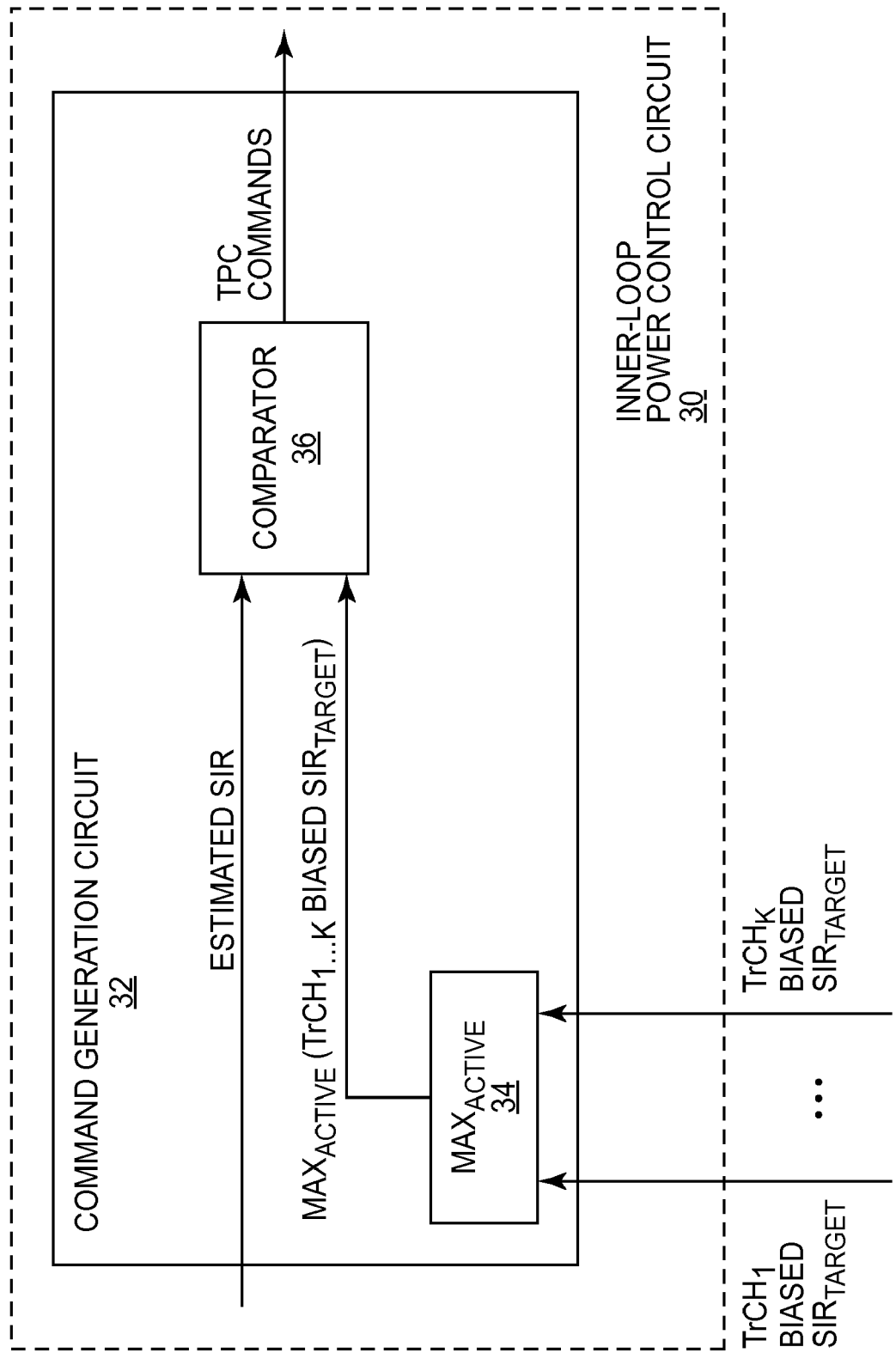
FIG. 3 is a block diagram illustrating one embodiment of an inner-loop power control circuit.

More particularly, the command generation circuit 32 may generate the TPC commands by comparing a maximum of the biased signal quality targets for the active $TrCHs_{1...K}$ to the estimated signal quality of the physical channel. FIG. 3 illustrates this embodiment of the command generation circuit 32, in the inner loop power control circuit 30, which operates to keep the transmit power on the physical channel at the lowest level that still permits achievement of the $BLER_{Target}$ specified on each of the $TrCHs_{1...K}$.

In FIG. 3, the command generation circuit 32 further includes a $max_{Active}$ circuit 34 and a comparator 36. The $max_{Active}$ circuit 34 determines the maximum biased $SIR_{Target}$ among the $TrCHs_{1...K}$ actively used for data transmission during the current transmission time interval. Notably, this maximum biased $SIR_{Target}$ represents the greatest SIR requirement among the active TrCHs and, if met, will permit achievement of the BLER target on all of the TrCHs. The comparator 36 then compares this maximum biased $SIR_{Target}$ to the estimated SIR of the physical channel. If the maximum biased $SIR_{Target}$ is greater than the estimated SIR, the power on the physical channel can be lowered without precluding the $BLER_{Target}$ specified on each of the $TrCHs_{1...K}$. Accordingly, the comparator outputs a TPC command (e.g., a value of −1) instructing the remote transmitter to decrease its transmit power. Conversely, if the maximum biased $SIR_{Target}$ is less than the estimated SIR, the power on the physical channel needs to be increased in order to achieve the $BLER_{Target}$ specified on each of the $TrCHs_{1...K}$. The comparator, therefore, outputs a TPC command (e.g., a value of 1) instructing the remote transmitter to increase its transmit power.

Figure 4:
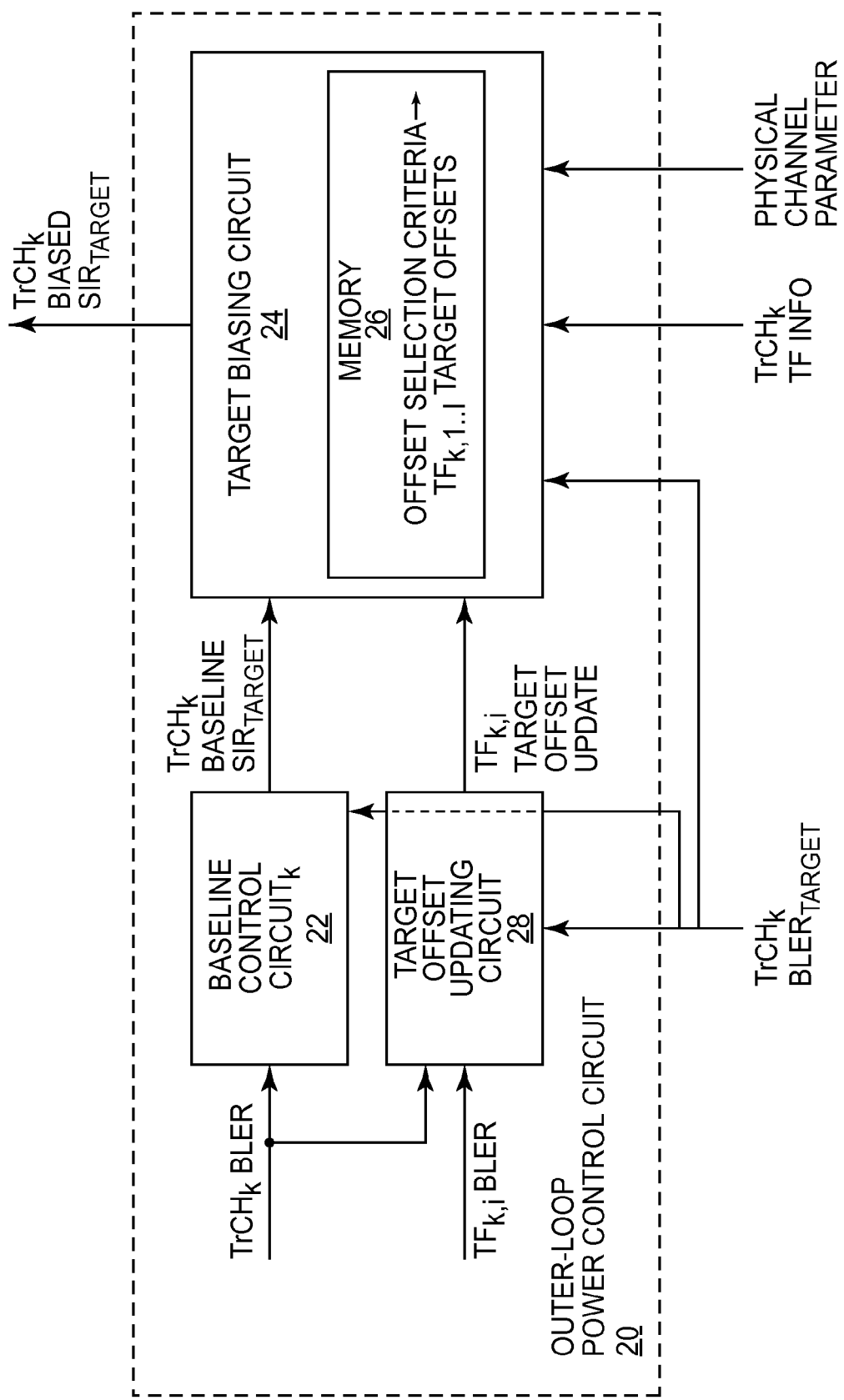
FIG. 4 is a block diagram illustrating one embodiment of an outer-loop power control circuit.

With the command generation circuit 32 generating TPC commands in this way (i.e., based on biased SIR targets), the transmit power of the remote transmitter may quickly be controlled to the requisite level, even upon deviation due to changes in TF use. Of course, such performance does depend on the value of the TF-specific target offsets applied to obtain the biased SIR targets. FIG. 4 shows one embodiment for determining these target offsets for the TFs of a given $TrCH_k$ (with other TrCHs excluded for illustrative purposes).

In FIG. 4, the target biasing circuit 34 includes a memory 26 for storing a plurality of values specific to a $TrCH_k$. Each stored value for the $TrCH_k$ depends on a particular $TF_{k,i}$, out of the possible $TFs_{k,1...I}$ that the $TrCH_k$ may use. A stored value may represent, for example, an additional SIR above the baseline $SIR_{Target}$ needed to achieve the $BLER_{Target}$ when using a particular $TF_{k,i}$. Accordingly, each stored value corresponds to one of a plurality of target offsets.

The target biasing circuit 34 selects one of the plurality of target offsets for biasing the baseline $SIR_{Target}$ based on one or more offset selection criteria illustrated in FIG. 4. One offset selection criteria shown is the $TF_{k,i}$ in use by the $TrCH_k$, which is determined from the $TrCH_k$ TF information as was discussed previously. Additional offset selection criteria may include, for example, the $TrCH_k$ $BLER_{Target}$ in order to more precisely select the value needed to achieve such a target. Still additional offset selection criteria may include a parameter of the physical channel, such as the type of physical channel, or other criteria not specifically illustrated (e.g., the logical channels included in or the block size of the radio access bearer). Those skilled in the art, therefore, will readily appreciate that the present invention is not limited by any certain offset selection criteria.

Furthermore, the description above has been in the context of stored target offsets whose values are fixed and selected for application accordingly. Yet, in alternative embodiments, the memory 26 stores target offsets as non-fixed, default values (e.g., zero). Once stored, these default values are updated or adapted to dynamically reflect the amount of bias needed to achieve the $TrCH_k$ $BLER_{Target}$. FIG. 4 illustrates one embodiment of an outer-loop power control circuit 20 for determining the target offset update of a given $TF_{k,i}$ in use by the $TrCH_k$.

In this embodiment, a target offset updating circuit 28 receives both the $TrCH_k$ BLER and the $TF_{k,i}$ BLER. As mentioned above, the $TrCH_k$ BLER is the BLER estimated for all data on the $TrCH_k$, regardless of the TF used. On the contrary, the $TF_{k,i}$ BLER is the BLER estimated for data received using only a given $TF_{k,i}$. Provided with both of these estimates, the target offset updating circuit 28 updates the target offset for that $TF_{k,i}$ based on the difference between the $TrCH_k$ BLER and the $TF_{k,i}$ BLER.

The target offset updating circuit 28 may provide this update to the target biasing circuit 24 in order to adjust the default value stored for that $TF_{k,i}$ or, if that default value has been updated previously by the target offset updating circuit 28, the currently stored value. The target biasing circuit 24 may thereafter apply this updated target offset to the $TrCH_k$ baseline $SIR_{Target}$. Such updating and application of the updated offset may be performed selectively for certain TFs of interest or importance, in which case the non-updated target offsets for less important TFs are applied as disclosed previously.

While FIG. 4 illustrates various ways to determine the TF-specific target offsets based on storing values in memory 26, those skilled in the art will appreciate such is not required of the present invention. Indeed, in other embodiments, the target biasing circuit 24 dynamically calculates the target offset for a given $TF_{k,i}$ based on a quality requirement for that TF. The calculation may be based upon, for example, a requirement that the energy per bit (Eb) be constant across changing TFs:

$$\frac{Eb}{No} = \frac{nchip}{nbit}\frac{Ec}{No} \quad (1)$$

where nchip is the number of chips per transmission time interval (TTI), nbit is the number of bits per TTI, Ec is the energy per chip and No is the noise energy.

Regardless of the manner in which the TF-specific target offsets are determined, therefore, application of these offsets facilitates quick convergence to the signal quality target necessary to achieve a given data error rate target. As a general overview of such application, FIG. 5 briefly illustrates the processing performed by power control loops 20, 30.

Figure 5:
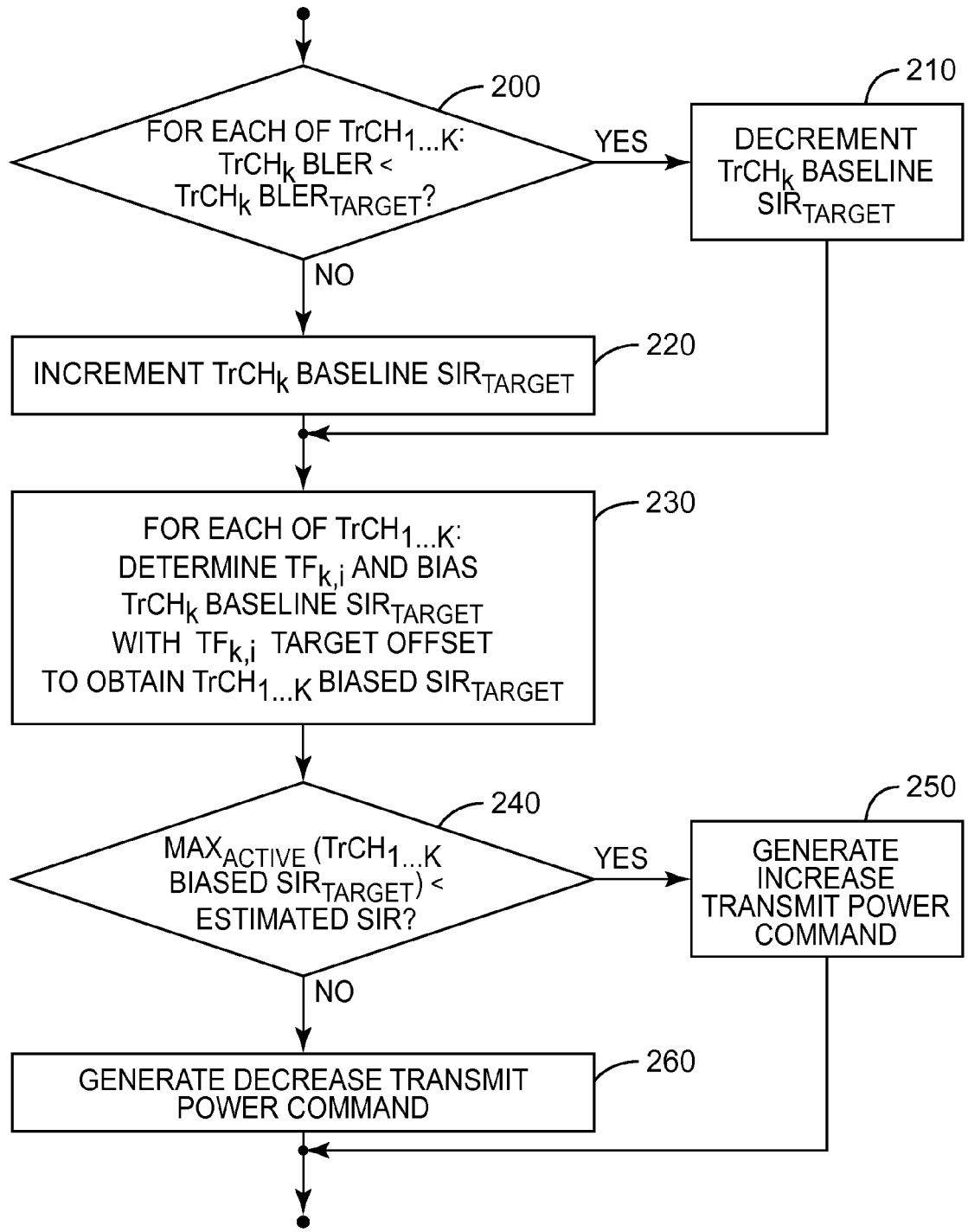
FIG. 5 is a logic flow diagram illustrating one embodiment of control procedures for inner and outer-loop power control.

In FIG. 5, the outer-loop power control circuit 20 compares, for each of the $TrCHs_{1...K}$, the estimated BLER and the $BLER_{Target}$ for that $TrCH_k$ (Block 200). If the estimated BLER is less than the $BLER_{Target}$, the outer-loop power control circuit 20 decrements the $TrCH_k$ baseline $SIR_{Target}$ (Block 210) (e.g., to account for decreased data error due to improved signal propagation conditions). Conversely, if the estimated BLER is greater than the $BLER_{Target}$, the outer-loop power control circuit 20 increments the $TrCH_k$ baseline $SIR_{Target}$ (Block 220) (e.g., to account for increased data error due to worsened signal propagation conditions). Having incremented or decremented the baseline $SIR_{Target}$ for each of the $TrCHs_{1...K}$, the outer-loop power control circuit 20 proceeds in processing to Block 230 in order to bias the baseline SIR targets with TF-specific target offsets. That is, for each of the $TrCHs_{1...K}$, the outer-loop power control circuit 20 determines the $TF_{k,i}$ in use and biases the $TrCH_k$ baseline $SIR_{Target}$ with the target offset particularized for that $TF_{k,i}$. Having done so for each of the $TrCHs_{1...K}$, the outer-loop power control circuit 20 obtains a biased $SIR_{Target}$ for each of the $TrCHs_{1...K}$. Provided with such biased SIR targets, the inner-loop power control circuit 30 determines the maximum of such targets (Block 240) and compares that maximum biased $SIR_{Target}$ to the SIR estimated on the physical channel. If the maximum biased $SIR_{Target}$ is less than the estimated SIR, the inner-loop power control circuit 30 generates a TPC instructing the remote transmitter to increase its transmit power (Block 250). Conversely, if the maximum biased $SIR_{Target}$ is greater than the estimated SIR, the inner-loop power control circuit 30 generates a TPC instructing the remote transmitter to decrease its transmit power (Block 260).

While the above discussion has expressed signal quality in terms of signal-to-interference ratio (SIR) and data error rate in terms of block error rate (BLER), those skilled in the art will understand that such has been merely for illustrative purposes. These values, of course, may also be expressed with other performance metrics, such as bit error rate (BER) or frame error rate (FER) in the case of data error rate.

Moreover, the baseline control circuits 22 have been disclosed above and in FIGS. 1 and 4 as receiving an already estimated data error rate. In one embodiment, for example, the data error rate was estimated by other circuits in the outer-loop power control circuit 20 based on a CRC. Alternative embodiments, however, contemplate that the baseline control circuits 22 directly receive CRC bits or flags in order to internally estimate the data error rate.

Furthermore, the power control apparatus and methods disclosed herein may operate in the context of either downlink or uplink. When operating in the context of uplink, for example, the wireless communication apparatus 10 may comprise a base station that controls the transmit power of a remote transmitter in a mobile station on an uplink channel. Conversely, when operating in the context of downlink, the wireless communication apparatus 10 may comprise a mobile station that controls the transmit power of a remote transmitter in a base station on a downlink channel.

Still further, a transport format as used herein may refer to the combination of the size of each transport block of data, the channel coding scheme or rate to be used for the transport blocks, the interleaving of transport blocks, the rate matching process, the mapping of the transport channels to the physical channel, and the transmission time interval over which the transport format applies.

Thus, it should be understood that the foregoing description and the accompanying drawings represent non-limiting examples of the methods and individual apparatuses taught herein. As such, the present invention is not limited by the foregoing description and accompanying drawings. Instead, the present invention is limited only by the following claims and their legal equivalents.

What is claimed is:

1. A method in a wireless communication apparatus of controlling the transmit power of a remote transmitter on a physical channel, comprising:
   maintaining a baseline signal quality target for each of one or more transport channels carried by the physical channel, the baseline signal quality target maintained for a given transport channel being common to all transport formats used by that given transport channel;

for each of the one or more transport channels, biasing the baseline signal quality target maintained for the transport channel with a target offset particularized for a given transport format in use by that transport channel, to obtain a biased signal quality target for each of the one or more transport channels; and generating transmit power control commands for the remote transmitter based on the biased signal quality targets, relative to an estimated signal quality.

2. The method of claim 1 further comprising maintaining a plurality of values in a memory, each value corresponding to one of a plurality of target offsets, and selecting one of the plurality of target offsets for biasing the baseline signal quality target maintained for a given transport channel based on one or more offset selection criteria, including the transport format in use by that given transport channel.

3. The method of claim 2 wherein the one or more offset selection criteria further include at least one of a data error rate target for that given transport channel and a parameter of the physical channel.

4. The method of claim 2 wherein maintaining a plurality of values in a memory comprises storing a plurality of default values in the memory.

5. The method of claim 4 further comprising updating at least one of the default values based on the difference between a data error rate for data received on a given transport channel, regardless of the transport format used, and a data error rate for data received on that given transport channel using a given transport format.

6. The method of claim 1 further comprising dynamically calculating the target offset based on a quality requirement for the given transport format.

7. The method of claim 1 wherein generating transmit power control commands comprises comparing a maximum of the biased signal quality targets for one or more transport channels that are active, to the estimated signal quality.

8. The method of claim 1 wherein the given transport format comprises at least one of a certain transport block size, transmission time interval, channel coding scheme or rate, interleaving of transport blocks, rate matching process, or mapping of the one or more transport channels to the physical channel.

9. The method of claim 1 wherein maintaining a baseline signal quality target comprises comparing a data error rate for data received on a given transport channel, regardless of transport format used, and a data error rate target for data received on that given transport channel.

10. The method of claim 9 wherein maintaining a baseline signal quality target further comprises determining the data error rate based on a cyclic redundancy check of data received on the given transport channel, regardless of transport format used.

11. A wireless communication apparatus configured to control the transmit power of a remote transmitter on a physical channel, comprising:

an outer-loop power control circuit comprising:
one or more baseline control circuits, the one or more baseline control circuits configured to maintain a baseline signal quality target for each of one or more transport channels carried by the physical channel, the baseline signal quality target maintained for a given transport channel being common to all transport formats used by that given transport channel;

a target biasing circuit configured to, for each of the one or more transport channels, bias the baseline signal quality target maintained for the transport channel with a target offset particularized for a given transport format in use by that transport channel, to obtain a biased signal quality target for each of the one or more transport channels; and an inner-loop power control circuit comprising a command generation circuit configured to generate transmit power control commands for the remote transmitter based on the biased signal quality targets, relative to an estimated signal quality.

12. The wireless communication apparatus of claim 11 wherein the target biasing circuit comprises a memory configured to maintain a plurality of values therein, each value corresponding to one of a plurality of target offsets, and wherein the target biasing circuit is further configured to select one of the plurality of target offsets for biasing the baseline signal quality target maintained for a given transport channel based on one or more offset selection criteria, including the transport format in use by that given transport channel.

13. The wireless communication apparatus of claim 12 wherein the one or more offset selection criteria further include at least one of a data error rate target for that given transport channel and a parameter of the physical channel.

14. The wireless communication apparatus of claim 12 wherein the memory is configured to maintain a plurality of values therein by storing a plurality of default values.

15. The wireless communication apparatus of claim 14 wherein the outer-loop power control circuit further includes a target offset updating circuit configured to update at least one of the default values based on the difference between a data error rate for data received on a given transport channel, regardless of the transport format used, and a data error rate for data received on that given transport channel using a given transport format.

16. The wireless communication apparatus of claim 11 wherein the target biasing circuit is further configured to dynamically calculate the target offset based on a quality requirement for the given transport format.

17. The wireless communication apparatus of claim 11 wherein the command generation circuit is configured to generate transmit power control commands by comparing a maximum of the biased signal quality targets for one or more transport channels that are active, to the estimated signal quality.

18. The wireless communication apparatus of claim 11 wherein the given transport format comprises at least one of a certain transport block size, transmission time interval, channel coding scheme or rate, interleaving of transport blocks, rate matching process, or mapping of the one or more transport channels to the physical channel.

19. The wireless communication apparatus of claim 11 wherein the one or more baseline control circuits are configured to maintain a baseline signal quality target by comparing a data error rate for data received on a given transport channel, regardless of transport format used, and a data error rate target for data received on that given transport channel.

20. The wireless communication apparatus of claim 19 wherein the one or more baseline control circuits are configured to maintain a baseline signal quality target by further determining the data error rate based on a cyclic redundancy check of data received on the given transport channel, regardless of transport format used.

* * * * *

UNITED STATES PATENT AND TRADEMARK OFFICE
CERTIFICATE OF CORRECTION

PATENT NO.        : 8,170,599 B2
APPLICATION NO.   : 12/420904
DATED             : May 1, 2012
INVENTOR(S)       : Andersson et al.

It is certified that error appears in the above-identified patent and that said Letters Patent is hereby corrected as shown below:

On Page 2, in Field (56), under "OTHER PUBLICATIONS", in Column 2, Line 6, delete "Pnoenix," and insert -- Phoenix, --, therefor.

In Column 4, Lines 19-20, delete "BLER target," and insert -- $BLER_{Target}$, --, therefor.

In Column 4, Lines 25-26, delete "SIR target" and insert -- $SIR_{Target}$ --, therefor.

In Column 6, Line 25, delete "BLER target" and insert -- $BLER_{Target}$ --, therefor.

Signed and Sealed this
Eighteenth Day of September, 2012

David J. Kappos
*Director of the United States Patent and Trademark Office*